United Stat

[11] 3,628,854

| [72] | Inventor | Arthur Jampolsky<br>Mill Valley, Calif. |
| --- | --- | --- |
| [21] | Appl. No. | 878,975 |
| [22] | Filed | Dec. 8, 1969 |
| [45] | Patented | Dec. 21, 1971 |
| [73] | Assignee | Optical Sciences Group, Incorporated<br>San Francisco, Calif.<br>Continuation of application Ser. No.<br>647,533, June 20, 1967, now abandoned.<br>This application Dec. 8, 1969, Ser. No.<br>878,975 |

[54] FLEXIBLE FRESNEL REFRACTING MEMBRANE ADHERED TO OPHTHALMIC LENS
7 Claims, 13 Drawing Figs.

[52] U.S. Cl. .................................................. 351/175,
351/45, 351/46, 351/47, 351/57, 351/165,
350/211, 350/286
[51] Int. Cl. ............................................. G02c 7/08,
G02c 7/14, G02c 7/16
[50] Field of Search .................................... 351/44–47,
57, 159, 175; 350/211, 286, 287

[56] References Cited
UNITED STATES PATENTS

| 2,248,638 | 7/1941 | Merton | 350/162 UX |
| 2,511,329 | 6/1950 | Craig | 351/47 |
| 2,884,833 | 5/1959 | Pohl | 350/144 X |
| 3,033,359 | 5/1962 | Mercer | 351/44 |
| 3,203,306 | 8/1965 | Lefferts | 350/211 |
| 3,004,470 | 10/1961 | Ruble | 350/211 X |

FOREIGN PATENTS

| 717,775 | 11/1954 | Great Britain | 350/317 |
| 369,993 | 12/1906 | France | 351/46 |
| 207,794 | 2/1940 | Switzerland | 351/47 |

*Primary Examiner*—David H. Rubin

ABSTRACT: A thin, fully conformable, plastic membrane which can be applied, and made to adhere with finger pressure, to spectacle lenses for quickly and impermanently changing one or more optical characteristics of the spectacle lenses. The membrane may be embossed on one of its surfaces to form a Fresnel-type lens or prism structure to introduce a deviation of the light ray, may be partially or entirely tinted to pass only certain wavelengths of light, may be diffused, or blurred uniformly or differentially, may have selective opaqued or transmitting areas or a combination thereof.

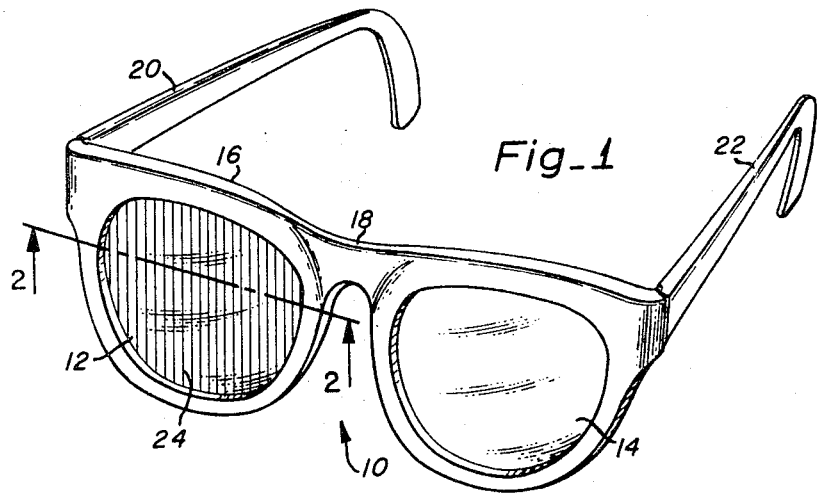
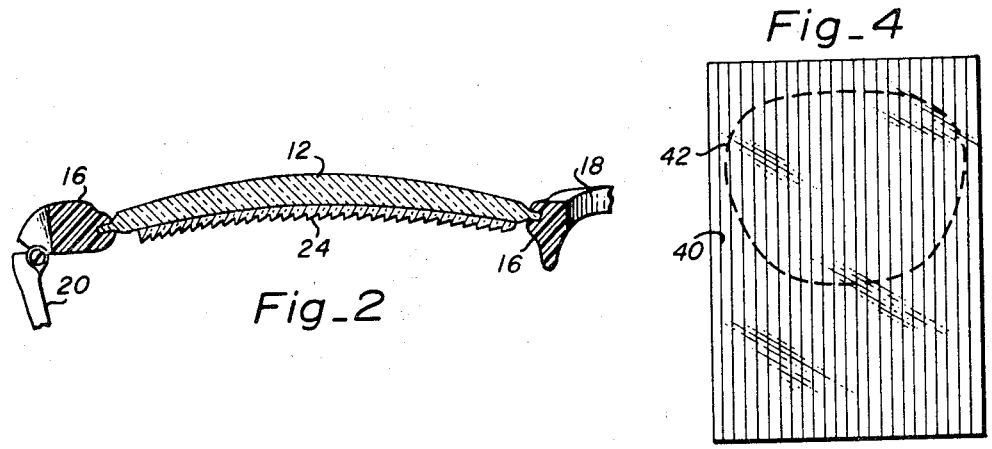
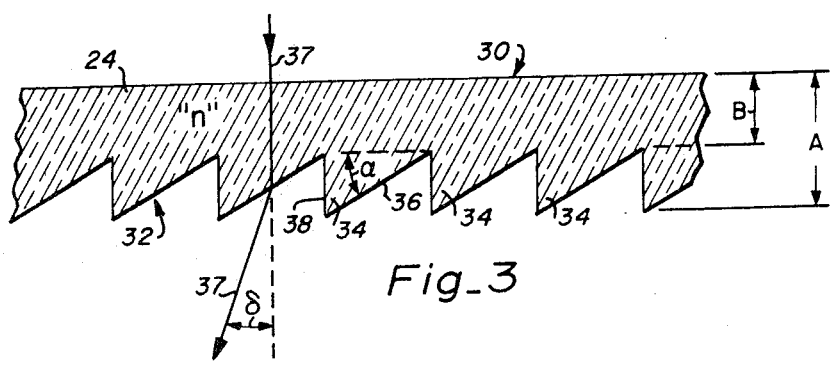
INVENTOR
ARTHUR JAMPOLSKY

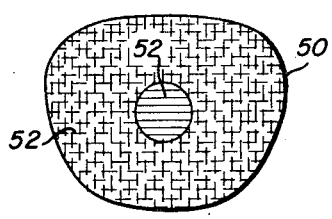
Fig_5
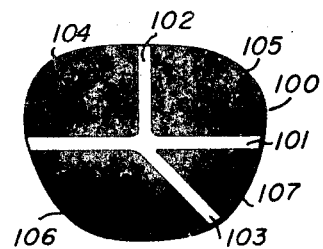
Fig_10
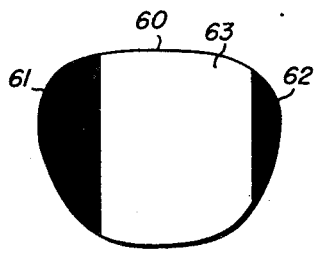
Fig_6
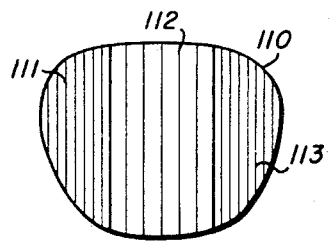
Fig_11
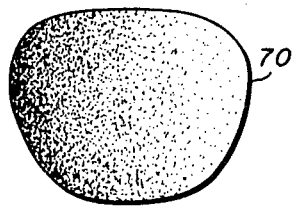
Fig_7
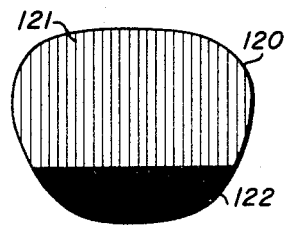
Fig_12
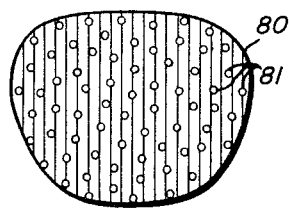
Fig_8
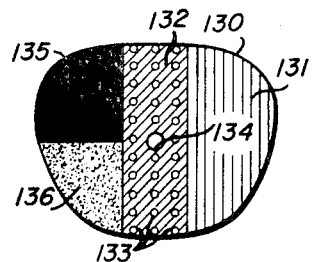
Fig_13
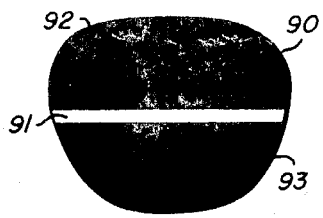
Fig_9
INVENTOR
ARTHUR JAMPOLSKY

FLEXIBLE FRESNEL REFRACTING MEMBRANE ADHERED TO OPHTHALMIC LENS

CROSS REFERENCE TO RELATED APPLICATIONS

This application is a continuation of U.S. Pat. application Ser. No. 647,533, filed June 20, 1967, and now abandoned.

BACKGROUND OF THE INVENTION

1. Field of the Invention

This invention relates to a method of impermanently modifying spectacle lenses and, more particularly, to a thin, flexible, membrane which is pressure adhesively attachable to the surface of the spectacle lens, and which allows the optical characteristic of the spectacle lens to be changed in many useful ways for purposes of diagnosing and treating human vision problems.

The term spectacle or spectacle lens as used herein is defined as any light refracting or nonrefracting elements mounted in a frame suitable for wearing before the eyes.

One of the very important types of applications would be the use of prismatic light beam deviators in the diagnosis and management of strabismus, and the invention will be described in particular detail in connection with this ocular deviation. However, it is to be understood that the press-on optical membrane of this invention has a much wider field of application and may modify the optical characteristics of lenses in many other ways and lends itself to solving a large variety of diagnostic and treatment problems known to eye specialists. The invention also is useful for simply changing the amount and quality of light reaching the eye for reasons such as convenience, comfort or appearance as well as the management of vision problems. The invention is also useful to change the optical characteristic of any optical element, whatever its kind or use.

2. Description of the Prior Art

Heretofore, one aspect of diagnosing and nonsurgically treating strabismus was accomplished either by inserting thick prismatic lenses of different power in the optical path of the two eyes, or by supplementing the usual lens with modifying prisms of glass or plastic. The modifying prisms have been attached to the spectacle frame in front of the normal lens, and have been either Fresnel design or normal prisms. Neither of these prior art devices have been found cosmetically acceptable by the wearer and by observers.

In addition to being cosmetically unacceptable, both types of prior art devices also have been found subjectively objectionable because of field distortion. In the thick prismatic lens, the required thickness is primarily responsible for the field distortion. In case of the anteriorly placed thick and rigid Fresnel prismatic structure, the distance between it and the eye is primarily responsible for field distortion.

Another disadvantage of the thick prismatic lens is that it has to be specially ground making it very expensive. One type of the nonsurgical treatment of strabismus usually involves a sequential modification of the prismatic correction from time to time. A specially ground prismatic lens has a fairly short useful life, and then must be discarded in favor of another lens of a different prismatic correction.

Other problems for which the prior art has offered no acceptable, inexpensive or readily available solution include: modifying the optical characteristics of spectacle lenses to allow selective vision or perception by either the macula or the peripheral retina, occluding all or part of the visual field to control fixation, totally or gradually diffusing the visual field such as is done to degrade peripheral or macular contours.

It is therefore a primary object of this invention to impermanently modify the optical characteristic of an optical element, utilizing a press-on optical modifier which modification can be quickly done by untrained individuals and with materials that are low enough in cost as to be disposable.

It is also a primary object of the present invention to provide an inexpensive method for impermanently modifying the optical characteristic of spectacles which method can be practiced easily and readily by the eye specialist for diagnostic or training purposes and by the patient or other personnel for treatment purposes.

It is another object of the present invention to provide a method for modifying the optical characteristics of spectacles by "pressing-on" to one or both surfaces suitable thin flexible films.

It is still another object of the present invention to provide a thin, fully conformable membrane which can be quickly and impermanently attached to a supporting element, as in spectacle lenses, and which has the function of a lens supplement, deviating prism, spectral filter, diffusion filter, intensity filter, semi-occluding element or selective aperture or combination thereof.

It is still another object of the present invention to provide a means for modifying the optical characteristics of spectacle lenses, or like optical elements, which is inexpensive, impermanent from the point of view that it may readily be changed, and which allows an unskilled person to undertake such modifications for continuous orthoptic treatment requiring progressive sequential correction as well as by eye specialists for temporary treatment as well as diagnosis of eye disorders.

It is still a further object of the present invention to provide a spectacle lens having a specified prismatic power which is cosmetically acceptable.

It is a further object of the present invention to provide a membrane having the ability to refract or deviate the light passing through it, which is readily and easily attached to either surface of a spectacle lens, is inexpensive, and is readily replaceable when different prism diopter power is desired or required, or when the direction of deviation is to be altered transversely or longitudinally for treatment purposes, even though the frequency of alteration may be only hours or minutes in duration.

It is still another object of the present invention to provide an inexpensive, disposable, membrane which is readily attachable to the surface of a spectacle lens by finger pressure adhesion and easily removed by finger manipulation.

It is still a further object of the present invention to provide an inexpensive and readily exchangeable means for modifying spectacle lenses or similar optics or ophthalmics in one or more of the following ways: changing the spectral transmission across the field of view; changing the light transmission to all colors by partial or entire occlusion with stenopaic slit, pin holes of uniform or varying size distributed either uniformly or stepwise or graded across the field; changing the light transmission either by uniform or graded diffusion; or a combination of each of the listed ways.

SUMMARY OF THE INVENTION

The present invention accomplishes these objects by providing a conforming, plastic material which has the desired optical properties. The total thickness of the membrane and the type of plastic material utilized is selected so that the membrane fully conforms to the curved surface of an ordinary spectacle lens, or any part of it, or any optical element, under ordinary finger pressure. Further, the plastic material and the nature of its surface is selected so that it will adhere to the optical element surface by one or more of the following phenomena: vacuum, electrostatic attraction, presence of an interfacial pressure sensitive adhesive, or inherent adhesive (intermolecular) forces between the membrane material and the lens material. Since the exact theory of adhesion is not yet fully understood and still subject to some dispute amongst the experts, and since such adhesion may bring into play one or more of the above phenomena, Applicant defines the term "pressure adhesive," for the purpose of this application, as the property of the membrane to adhere to the optical element by the application of pressure, regardless of the phenomenon or phenomena which are responsible for such a result.

If the desired optical property is deviation, such as is commonly used for diagnosing and treating strabismus, one surface of the membrane may have embossed on it a plurality of parallel, narrow prisms of a preselected refractive power. A configuration of this type is known as a Fresnel prism.

For diagnostic purposes, a plurality of such prismatically embossed membranes are provided, each having a different refractive power. These Fresnel prism membranes, being adapted to be pressed onto the spectacle surface, can rapidly be exchanged or rotated about an axis normal to the spectacle. For treatment purposes, the patient may be provided with a prismatic membrane suitable for his particular needs which is exchanged as necessary with a similar membrane of a different prism strength, or the prism axis may be rotated differentially between the two eyes, or the light through the respective spectacle elements may be attenuated or diffused independently either interdaily or intradaily.

Other optical properties may be obtained by partially or entirely coloring (tinting), diffusing or opaquing the optical membrane, either uniformly, or differentially, or, according to a special pattern, so as to regulate the quantity and character of light entering one or both eyes. For some applications, combinations of the above optical properties may be desirable and are obtained by special treatment of the optical membrane, or by superimposing several membranes, or by combining parts, in segmental fashion, directly upon the spectacle lens.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

BRIEF DESCRIPTION OF THE DRAWINGS

FIG. 1 is a perspective view of a pair of spectacles having a prismatically embossed membrane adhesively affixed to one of its spectacle lenses;

FIG. 2 is a partial cross-sectional view taken along line 2—2 of FIG. 1;

FIG. 3 is an enlarged fractional cross-sectional view taken through a prismatically embossed membrane constructed in accordance with this invention when not pressed onto a lens;

FIG. 4 is a sheet of prismatically embossed membrane from which the spectacle lens applique of this invention may be cut; and FIGS. 5 through 13 are various alternate embodiments of the optical modifying membranes of this invention, each providing a different optical modifying characteristic.

FIG. 5 illustrates a two-tint filter membrane;

FIG. 6 illustrates a partially occluded membrane;

FIG. 7 illustrates a diffused membrane;

FIG. 8 illustrates a multiple pinhole membrane;

FIGS. 9 and 10 illustrate membranes having transparent strips;

FIG. 11 illustrates multiprism membranes;

FIG. 12 illustrates a partially prismed and partially occluded membrane; and

FIG. 13 illustrates a combination membrane including a filter section, a prism section, a pinhole section, a diffused section and an opaque section.

DESCRIPTION OF THE PREFERRED EMBODIMENT

Referring now to FIGS. 1 and 2 of the drawing, there is shown a pair of spectacles 10 which conventionally comprise a pair of lenses 12 and 14 carried in a spectacle frame 16 having a bridge 18 and a pair of ear bows 20 and 22. In accordance with one embodiment of the present invention, a thin membrane 24, embossed with a stepped surface, is provided which is shown adhesively affixed to the posterior surface of lens 12 to deviate (refract) the light beam through a preselected angle.

The stepped surface of membrane 24 is of the straight ridge type, but may also comprise a series of concentric echelon surfaces of constant or progressively varying angles of inclination as the "step" recedes from the center of the lens. The basic design in which the angle of inclination varies progressively with the distance from the center was proposed by Fresnel in 1822 as a means of constructing large aperture lenses for lighthouses on the French coast, and lenses or prisms constructed with an echelon or stepped surface are commonly designated as Fresnel lenses or prisms. See, for example, the Encyclopedia Britannica, published by Encyclopedia Britannica, Inc. (1965), Volume 13, pp. 953. Accordingly, optical membrane 24 embossed with a stepped surface will also be referred to as having a Fresnel construction.

Fresnel-type prismatic membrane 24 is made of a conformable, pressure adherable, water clear material such as, for example, vinyl butyrate. As best seen in FIG. 3, it has a smooth planar surface 30 which is pressure adhesively affixed to the posterior lens surface so that the distance between the eye of the spectacle wearer and membrane 24 is a minimum, thereby reducing distortion in the visual field and reducing cosmetic objections for wearer and observer. The other surface 32 of membrane 24 is linearly ridged or stepped across the entire membrane to form prismatic ridges 34 having an inclined face 36 and a perpendicular face 38.

The angle of inclination $\alpha$ of inclined face 36 is selected to provide a desired angular deviation $\delta$ of a light ray 37, which is defined as the power of the prism and is usually measured in "prism diopters." The angle of deviation $\delta$ of line of sight 37, the angle of inclination $\alpha$, and the index of refraction $n$ of the plastic material of membrane 24 are related by the expressions:

$$\delta = \sin^{-1}(n \sin\alpha) - \alpha$$

Membrane thickness "A," which is defined as the distance between surface 30 and the crest of prismatic ridges 34, and membrane thickness "B," which is defined as the distance between surface 30 and the troughs of prismatic ridges 34, are selected in accordance with the following criteria. Thickness "A" should be as small as possible so that membrane 24 readily and easily conforms to either the posterior or the anterior surface of any commonly encountered lens configuration, and to make the membrane as cosmetically acceptable as possible to the wearer. It has been found that for a vinyl butyrate membrane, thickness "A" up to as much as one-sixteenth inch is entirely acceptable. For thicknesses very much in excess of one-sixteenth inch, the membrane conformability and its cosmetic acceptability are less than optimum.

Dimension "B" should likewise be as small as possible, but is limited by the physical strength necessary to minimize the danger of tearing. Further, the smaller the dimension "B" can be made, the greater is the possible beam deviating ability of a given thickness "A" of the plastic film. It has been found that for a vinyl butyrate membrane, a thickness "B" on the order of one sixty-fourth inch is entirely satisfactory from a physical strength point of view. The distance from one prism ridge to the next is not critical but, for the best cosmetic results, should be held to a minimum. It has been found feasible to fabricate Fresnel type prisms and lenses of excellent optical quality having a prism width as small as 0.002 inch.

While vinyl butyrate sheet plastic has been found desirable for fabrication of the various spectacle modifying membranes, any material meeting the following specifications would be suitable. The material should be optically clear, capable of accepting colored dyes and of being overprinted with opaque or transparent inks. It should have sufficient flexiblity, strength and elasticity to permit handling thin films as well as being able to conform to toric and spherical surfaces characteristic of most spectacle lenses. The greater the index of refraction the thinner the foil that will be needed and, consequently, the easier to conform to doubly curved surfaces. The material should be embossable by pressure and/or temperature and able to hold with excellent precision the embossed contours at ambient temperatures and under pressures encountered in storage, packaging and handling.

The quality of conformability is further defined by stipulating that the membrane can be pressure adhesively attached to the surface of a lens and remain there under the influence of the available bonding forces which hold the membrane and the lens together. In this connection, it should also be realized that, for relatively thin films as the membrane herein, the elasticity or resilience should be sufficiently small so that the membrane adhesively adheres to the lens with a force greater than its inherent restoring force. This latter statement is applicable to restoring forces parallel and perpendicular to the plane of the membrane, the latter being controllable, at least to some extent, by the thickness "A." These two physical properties are defined herein as "pressure adhesively attachable" and "remaining conformed when adhesively bonded."

In the use of different plastic materials, there will be differences in conformability or in refractive properties which will modify the thicknesses "A" and "B" to some extent. In all instances it is necessary that the elastic restoring forces of the conformed film be less than the bond strength between the film and the spectacle lens.

While the above description of the membrane, and particularly the term "pressure adhesively attachable" have primary reference to the process of pressing the membrane directly on the lens surface, it is to be understood that attachment may also be made by interposing a fluid film between the membrane and the lens surface which brings into play the physical phenomena of surface tension. Since surface tension is generally understood to result from molecules close to the surface of the liquid which exerts a force of attraction to the molecules of the surface of the solid, and thereby bring into play intermolecular forces, the term "adhesively affixed" is not limited to a bond between two solids, but includes the interposition of a liquid. Because the field of intermolecular adhesion is not entirely understood, and no uniformity exits relative to a definition, the term "adhesively attachable" as used herein, because it involves intermolecular forces, refers to both solid-solid adhesion and solid-liquid adhesion. The conforming force may also be electrostatic or result from the vacuum effect between the film and the smooth substrate.

In the use of the invention, a determination is made of the necessary prism diopter required for the treatment or diagnosis of the specific case. Thereafter, a membrane is cut out of a suitable sheet of membrane stock, such as 40 shown in FIG. 4, of a specific prism power and pressed onto the surface of the lens by finger pressure. If, for some reason, it is desirable to change the prism diopter of the lens membrane combination, such as is usually the case in progressive management of strabismus, the membrane in place is peeled off from the lens surface and a new membrane is pressed on.

In certain applications, only a temporary modification of the spectacle lens may be desired, such being the case where a person is to train his visual apparatus, to relieve eye strain or modify the spectacles for temporary, special tasks. In such cases, the membrane is attached during the required use periods and thereafter is removed so that the wearer requires only a single pair of glasses.

While the prismatic press-on membrane described above has planar inclined faces 36, is linearly ridged across the entire membrane, and has a constant thickness "B," many modifications within the scope of this invention are readily made. For example, thickness "B" may be made to vary over the entire surface of the press-on membrane in the manner of a prescription lens. A press-on membrane so modified would enable a user to convert an ordinary pair of sun glasses or a pair of ordinary clear glasses to a combination prescription glass with a prismatic structure, or the reverse. Further, inclined surfaces 36 may be the segment of a cylinder, or the sawtooth ridges themselves may be concentric instead of linear and thereby produce a Fresnel-type cylindrical or spherical lens structure. Of course, two or more of the above described modifications may be combined readily to modify the optical properties of lenses in a manner not heretofore economically feasible. Since the press-on membrane may be readily constructed by embossing techniques, any of the above-mentioned modifications are readily and economically made.

Further, this invention may be utilized to provide a variety of visual modifying elements, each consisting of a thin, flexible, conformable plastic sheet cut to fit a spectacle lens and being embossed, colored, overprinted, diffused or partially or completely opaqued, being finger pressed onto either surface of a spectacle lens so as to make bubble free contact and adhere impermanently to the surface. The membranes may be changed in rapid succession during diagnosis of ocular conditions, periodically during treatment and management of visual anomalies or orthoptic training, or on a random or intermittent program for convenience, cleanliness of therapeutic reasons. They can be used to control the degree of transmission and spectral quality of light reaching the eye from time to time, the direction from which light is admitted or the amount or quality reaching a given portion of the eye at any time as well as the degree of image sharpness over the field of view.

Referring now to FIG. 5 of the drawing, there is shown membrane 50 of the filter type having a peripheral portion 51 which is tinted blue and a central portion 52 which is tinted yellow. This particular transmission combination will allow induction or enhancement of macular perception by stimulating the peripheral retina with blue to enhance the macular perception to yellow. Providing portions 51 and 52 with different shapes and/or different tints also provides the eye specialist with means by which he may, be way of example, differentially stimulate the macula of one eye and the peripheral retina of the other eye. By tinting all of membrane 50 entirely with one color, or only 51 or 52, such as gray or green, a press-on membrane is provided which is useful to convert ordinary clear prescription glasses into prescription sun glasses. Press-on membrane 50, or parts 51 and 52, also may be constructed of a polarizing material, which may or may not be tinted, to convert either clear prescription glasses or ordinary sun glasses to polarized glasses. Finally, the tint may be graded, ranging from a deep tint at the top portion to almost no tint at the bottom portion, to afford maximum protection from light coming from the horizon and above and allowing substantially clear vision in a downward direction. Such press-on membranes would be extremely useful in the cockpit of an airplane where a minimum tint is desired when viewing the instrument panel and a maximum tint is desired to protect against sunlight when looking out through the windshield.

FIG. 6 illustrates press-on membrane 60 which includes a pair of occluded portions 61 and 62 and a centrally disposed clear portion 63. Partially occluded membrane 60 finds extensive application in redirecting and controlling visual fixation of the eyes by occluding parts of the visual field where one does not wish the subject to use his two eyes together and to force the subject to use the two eyes together on those parts of the lens which are not occluded. Occluded membrane 60 may also be used to control fixation such as by switching the adaptive patterns so that first one eye is made to fix in a certain way and then the other eye is made to fix in a certain way. For treatment of eye disorders requiring a switching of the adaptive pattern, occluded membrane 60 has the great advantage of being readily removable and affixable at will and for short times.

FIG. 7 shows a press-on membrane 70 which is gradedly diffused, the diffusion being heaviest on the left side of FIG. 7 and becoming lighter toward the right side. Membrane 70 is useful to control disorders of visual fixation. Diffuser membrane 70 is constructed in such a manner that it degrades or washes out either the peripheral or the macular contours of the visual image in such a way so as to alter dominance from one eye to the other. Diffusion membrane 70 may be combined with a tint over the entire or part of the field and also with occluded portions where this is desirable.

FIG. 8 shows a press-on type lens 80 having a plurality of pinholes 81 which are spaced sufficiently close to one another so that the pinholes are not disturbing to the wearer when adhesively attached to one surface of the spectacle. The pinhole apertures may be varied as to size and distribution according to the particular visual needs. The entire membrane 80 may be opaque, or may be flesh colored for cosmetic reasons.

FIG. 9 shows a press-on membrane having a transparent stenopaic slit portion 91 and a pair of occluded portions 92 and 93. The width of stenopaic slit 91 is selected to suit the needs of home or outdoor illumination. One application for membrane 90 is to convert ordinary lenses to snow lenses.

FIG. 10 shows a press-on membrane 100 having a number of stenopaic slits such as 101, 102, and 103. Portions 104, 105, 106 and 107 may either be opaque or heavily tinted, in which case the optical properties of membrane 50 closely simulate a structure known as "Eskimo" sun glasses which are useful for protecting the eyes from very intense light conditions such as are encountered when the sun is shining on snow.

FIG. 11 illustrates a press-on membrane 110 which includes three different prismatic sections 111, 112 and 113. These three sections may be formed by embossing techniques or may be assembled from three different portions, each portion comprising a different one of the prisms. If constructed in different portions, each portion may be separately pressure adhesively affixed to the eye glass or, in the alternative, may be mounted on a common base which is then pressure adhesively affixed to the eye glass. Membranes such as 110 are useful in correcting for eye muscle problems by causing the patient to use his eyes together in different fields when one eye does not track or travel in the same manner as the other eye.

Press-on membrane 120 of FIG. 12, which illustrates the combination of an upper prismatic portion 121 and a lower occluded portion 122, is useful in those instance where both eyes are used for distant vision through a corrective prism but only one is ordinarily used for near vision such as for reading.

FIG. 13 illustrates membrane 130 constructed of many different portions, each having different optical characteristics, and is included herein to show the many combinations possible for a single press-on membrane. For example in membrane 130, portion 131 may be a prism (Fresnel-type or otherwise) or may have a curved surface to form a lens, or a combination of a prism and a lens. Portion 132 may be a tinted filter, with or without pinholes 133, and with or without a central aperture 134 of a different tint. Portion 135 may be occluded and portion 136 may be diffused, either uniformly or gradedly. It is also desirable to be able to provide the additive effect of two or more membranes such as, for instance, a stenopaic slit with tinted aperture and refraction of the line of sight.

The membrane of FIG. 13 is shown primarily to indicate the large variety of optical characteristics which can be incorporated in a single membrane structure or a combination of membranes. Heretofore such different optical properties could not practically be combined into a single structure.

There has been described herein an optical membrane of the press-on type which can readily and impermanently modify the optical characteristics of spectacles in almost an infinite number of useful ways. The membranes are inexpensive to manufacture so that they may be regarded as disposable, and are pressure adhesively affixable to the spectacle lens surface by finger pressure.

While the above detailed description has shown, described and pointed out the fundamental novel features of the invention as applied to various embodiments, will be understood that various omissions an substitutions and changes in the form and details of the device illustrated may be made by those skilled in the art, without departing from the spirit of the invention. It is the intention, therefore to be limited only as indicated by the scope of the following claims.

What is claimed is:

A device for ophthalmic use in treating a disorder of the eye comprising the combination of:
  a. an ophthalmic lens of predetermined prescription through which light rays are transmitted to an eye;
  b. a thin, flexible membrane formed of light-transmitting plastic material and having opposed surfaces, one of which is planarly smooth and adhered to a light-transmitting surface of said ophthalmic lens in conforming relationship thereto; the surface of said membrane opposite said planarly smooth surface having formed therein a plurality of stepped ridges each having a sloping face providing refractive power and a face substantially normal to the planarly smooth surface, said ridges constituting a Fresnel refracting surface which refracts the light rays transmitted through said ophthalmic lens and said membrane to said eye in a manner enabling treatment of said disorder;
  c. the thickness of said membrane from said planarly smooth surface to the crest of said ridges being of a magnitude which permits conformability of the membrane to the lens and is cosmetically acceptable, said thickness from the planarly smooth surface to said crest being not substantially greater than approximately one-sixteenth inch, the thickness of said membrane from the planarly smooth surface to the troughs of said ridges being of a magnitude which permits conformability of the membrane to the lens and provides sufficient physical strength to prevent tearing of the membrane, said thickness from the planarly smooth surface to said trough being not substantially less than approximately one sixty-fourth inch, and ridge spacing being held to a minimum value, but not less than approximately 0.002 inch to provide cosmetic acceptability.

2. The device of claim 1 wherein (d) said Fresnel refracting surface is a Fresnel prism.

3. The device of claim 1 wherein (d) said Fresnel refracting surface is a Fresnel lens.

4. The device of claim 1 wherein (d) said adherence is effected by the molecular surface adhesion between said membrane and said ophthalmic lens.

5. The device of claim 1 wherein (d) said membrane is formed of a vinyl butyrate plastic.

6. The device of claim 1 wherein (d) said ophthalmic lens surface is the posterior surface thereof.

7. The device of claim 1 wherein (d) said membrane is formed of a vinyl butyrate plastic and (e) said adherence is effected by finger-pressure adhesion.

* * * * *